March 12, 1940.    M. R. SHAW ET AL    2,193,258
SANITARY POULTRY FOUNTAIN
Filed Nov. 29, 1935    3 Sheets-Sheet 2
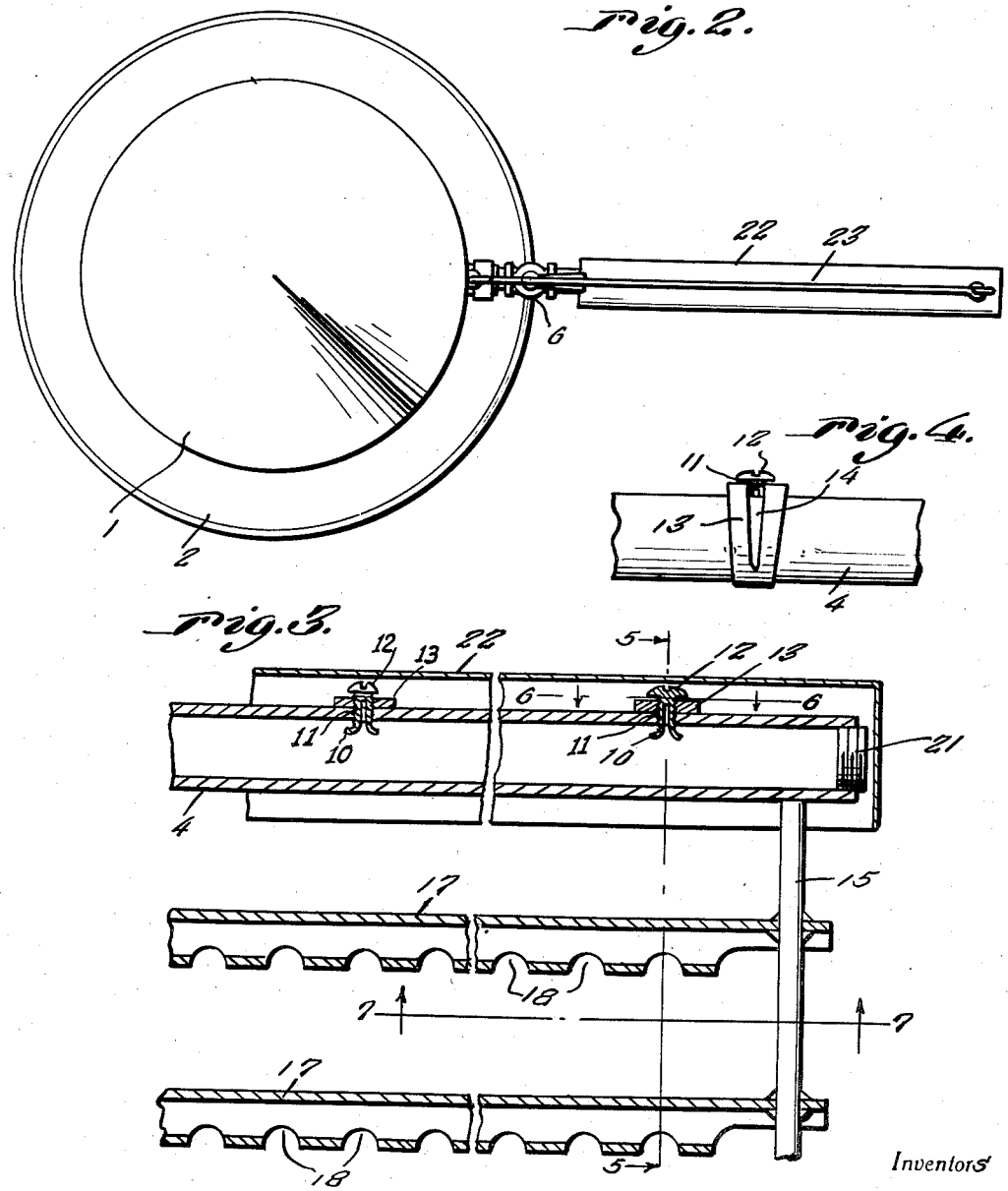

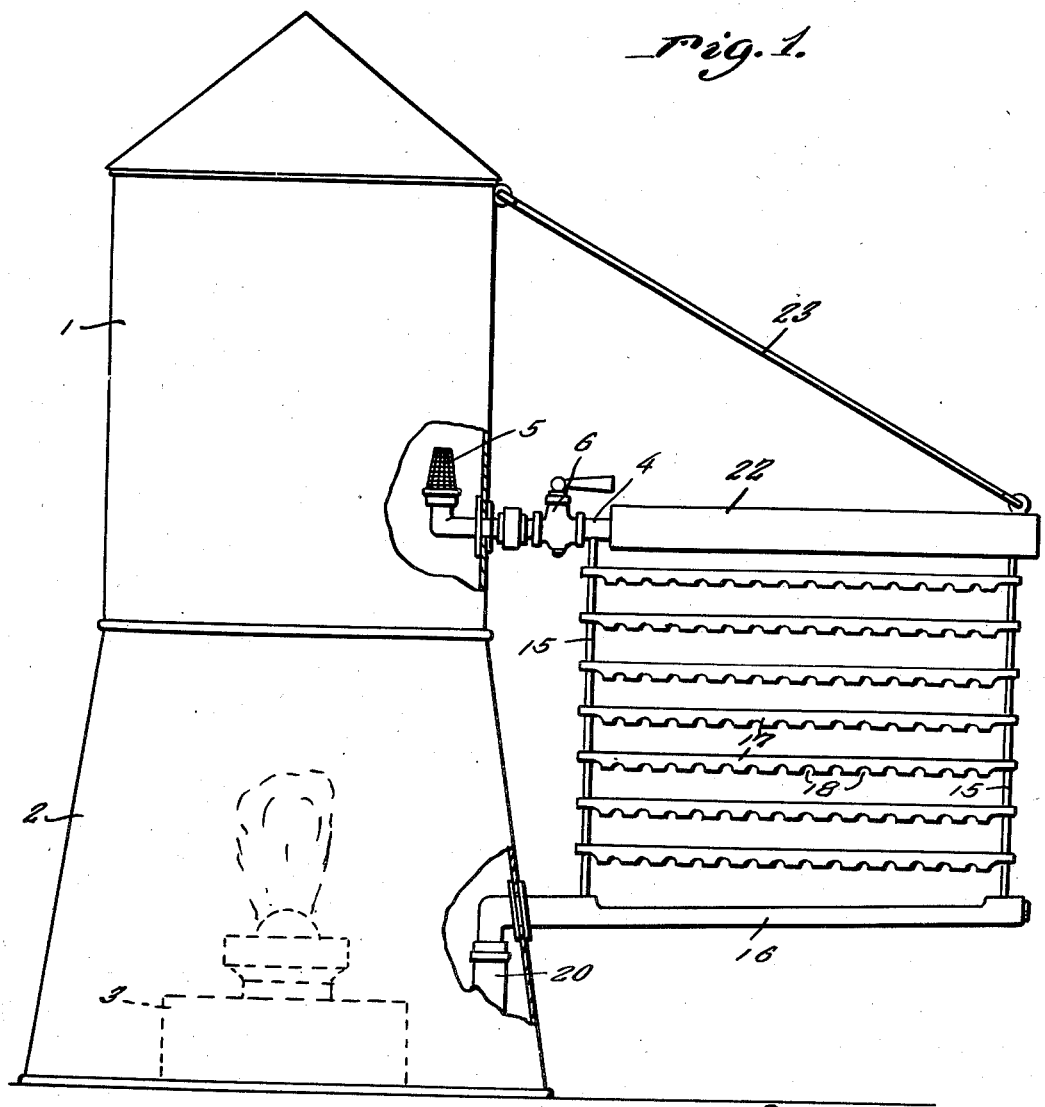
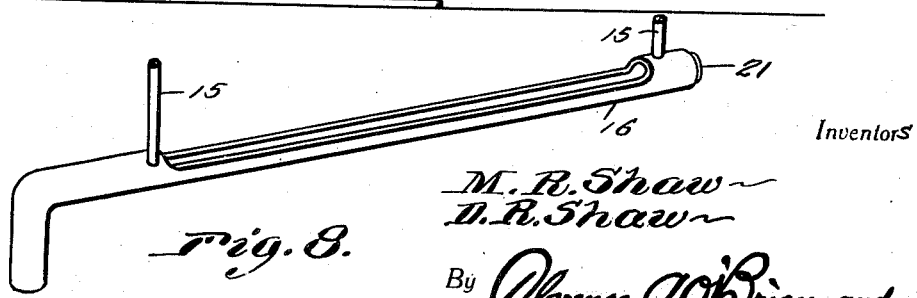

March 12, 1940. M. R. SHAW ET AL 2,193,258
SANITARY POULTRY FOUNTAIN
Filed Nov. 29, 1935    3 Sheets-Sheet 3
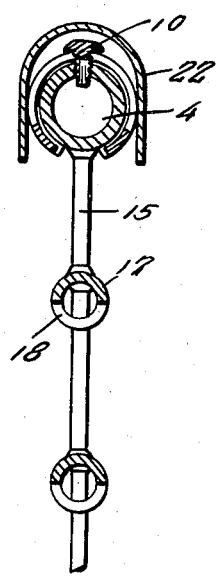
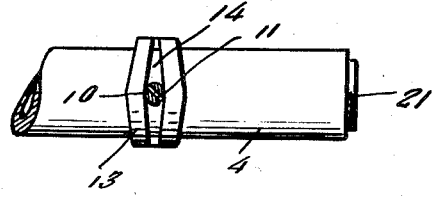
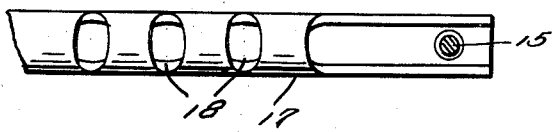
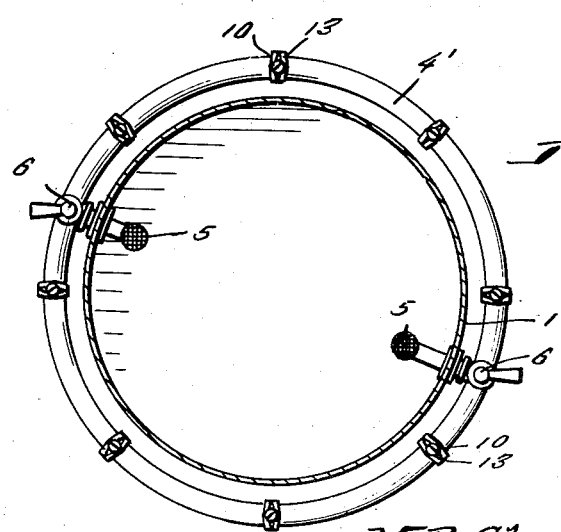
Inventors
M. R. Shaw
D. R. Shaw
By Clarence A. O'Brien and Hyman Berman
Attorneys Patented Mar. 12, 1940

2,193,258

UNITED STATES PATENT OFFICE 2,193,258

SANITARY POULTRY FOUNTAIN

Merritt R. Shaw and Darus R. Shaw, East Jordan, Mich.

Application November 29, 1935, Serial No. 52,222

3 Claims. (Cl. 119—72)

This invention relates to a sanitary poultry fountain, the general object of the invention being to provide means for delivering the water downwardly along a frame in drops so that the poultry can pick up the drops of water as it passes down the frame.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation with parts broken away of the apparatus.

Figure 2 is a top plan view of the apparatus.

Figure 3 is a fragmentary vertical sectional view through portions of the frame.

Figure 4 is a fragmentary elevation of the slotted collar on the supply tube this view also showing the valve member.

Figure 5 is a section on the line 5—5 of Figure 3.

Figure 6 is a section on the line 6—6 of Figure 3.

Figure 7 is a section on the line 7—7 of Figure 3.

Figure 8 is a view of the drain trough.

Figure 9 is a horizontal sectional view showing a modification of the invention.

In these drawings the numeral 1 indicates a supply tank which is supported on a hollow base 2 into which may be placed a lamp 3, as shown in dotted line in Figure 1 for heating the water in the tank during cold weather.

A horizontally arranged supply pipe 4 has one end entering the tank and this end is provided with a screen 5 for screening the water passing from the tank into the pipe 4 and the flow of water to the pipe 4 is controlled by a valve 6.

This pipe is provided with a row of holes in its top and into each hole extends a split valve member 10, the split portion of which extends above the pipe where it is intersected by a transverse hole 11. The upper end of the valve member is provided with a kerfed head 12 so that it can be turned by a screw-driver or the like. A plurality of collars 13, one for each valve member is placed on the pipe 4 and each collar has a slit 14 therein having its widest part at the top with the valve member passing through said wide part. The slit gradually decreases in width downwardly to its end from this top wide portion. As shown more particularly in Figure 5, each collar is of split construction with its ends spaced apart at the lower portion of the pipe 4 and the collar is slightly spaced from the pipe so that water passing from the hole 11 will flow into the slit or slot 14 and then pass down the same and between the ends of the collar and the pipe and then fall from the lower part of the pipe in the form of drops. By changing the position of the valve member the amount of water passing into each slot 14 can be regulated.

Rods 15 have their upper ends connected with the pipe and their lower ends connected to a drain trough 16 and a plurality of tubes 17 are supported by the rods 15 in spaced relation and each tube is formed with a plurality of spaced notches 18 at its lower part.

Thus the water passing through each valve 10 is formed into two parts which flow downwardly through the slot 14 and forms a drop at the underpart of the pipe 4. This drop of water drops upon the upper tube 17 which divides it into two drops and these drops pass to the underside of the tube 17 and the drops on said tube are separated by the notches 18. Then the drops of water from the upper tube 17 drop upon the next tube 17 and this continues until the drops of water fall into the trough 16 through which the water passes to a suitable drain through a pipe 20 connected to the lower end of the trough.

The outer ends of the pipe 4 and the trough 16 are closed by plugs 21 which facilitate cleaning of the parts and a hood 22 covers the pipe 4 and a rod 23 has one end connected with the top of the tank and the other to the hood as shown in Figure 1.

In that form of the invention shown in Figure 9 the pipe 4' is made in the form of a ring surrounding the tank as are the tubes 17 and the trough 16. In other respects this form of the invention is similar to the first described.

From the foregoing it will be seen that the water passes downwardly along the parts of the device in the form of drops and can easily be picked up by the poultry and by having a plurality of the tubes 17 arranged one above the other drops can be secured by large and small poultry.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:

1. A fountain of the class described comprising a tank, a supply pipe having one end in communication therewith, a plurality of openings in the top part of the pipe, a valve member in each opening for regulating the amount of water passing therethrough, a split collar for each valve having a slot therein wider at its top than at its end with the valve passing through the wide part of the slot, the split ends of the collar being spaced from the lower portion of the pipe, a vertical row of notched tubes located under the supply pipe, the notches being on the bottom portions of said tubes, a trough located under the lowermost notched tube and drain means connected with the trough.

2. A fountain of the class described comprising a tank, a supply pipe having one end in communication therewith and having a plurality of openings in the top part thereof, a valve member in each opening for regulating the amount of water passing therethrough, a split collar for each valve having a slot therein wider at its top than at its end with the valve passing through the wide part of the slot, and a vertical row of notched tubes located under the supply pipe.

3. A drinking fountain for poultry and the like comprising a supply pipe having a plurality of openings in the top part thereof, a valve member in each opening for regulating the amount of water passing therethrough, and means for causing the water from said supply pipe to form drops at the under part of the same, said means comprising a split collar for each valve having a slot therein wider at its top than at its end with the valve passing through the wide part of the slot.

MERRITT R. SHAW.
DARUS R. SHAW.